No. 744,067. PATENTED NOV. 17, 1903.
L. HACHENBERG.
WEIGHING MACHINE.
APPLICATION FILED OCT. 28, 1902.
NO MODEL. 2 SHEETS—SHEET 1.
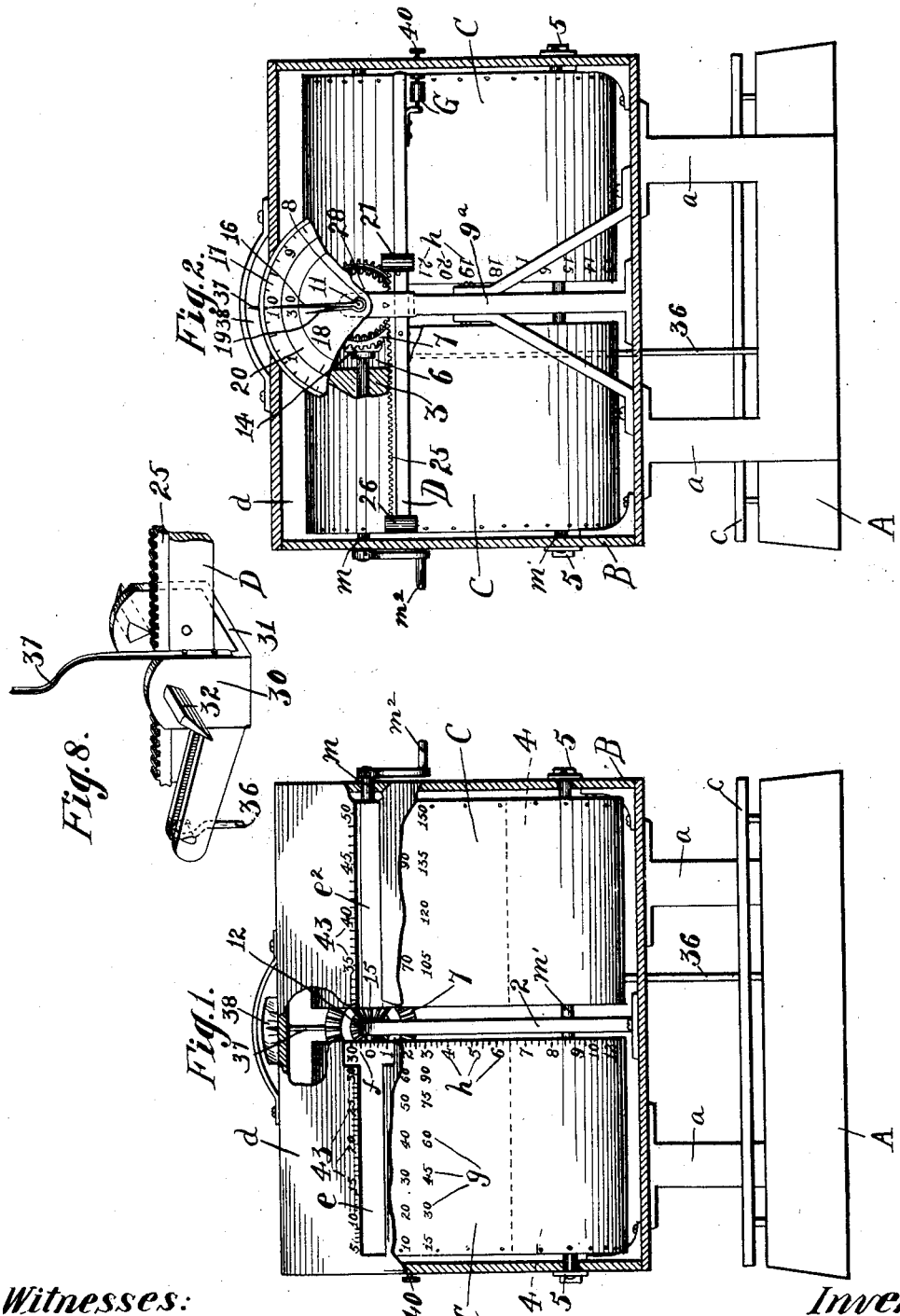
Witnesses:
F. G. Hachenberg.
E. Everett Ellis
Inventor:
Louis Hachenberg,
By his Attorney
F. H. Richards.

No. 744,067. PATENTED NOV. 17, 1903.
L. HACHENBERG.
WEIGHING MACHINE.
APPLICATION FILED OCT. 28, 1902.
NO MODEL. 2 SHEETS—SHEET 2.
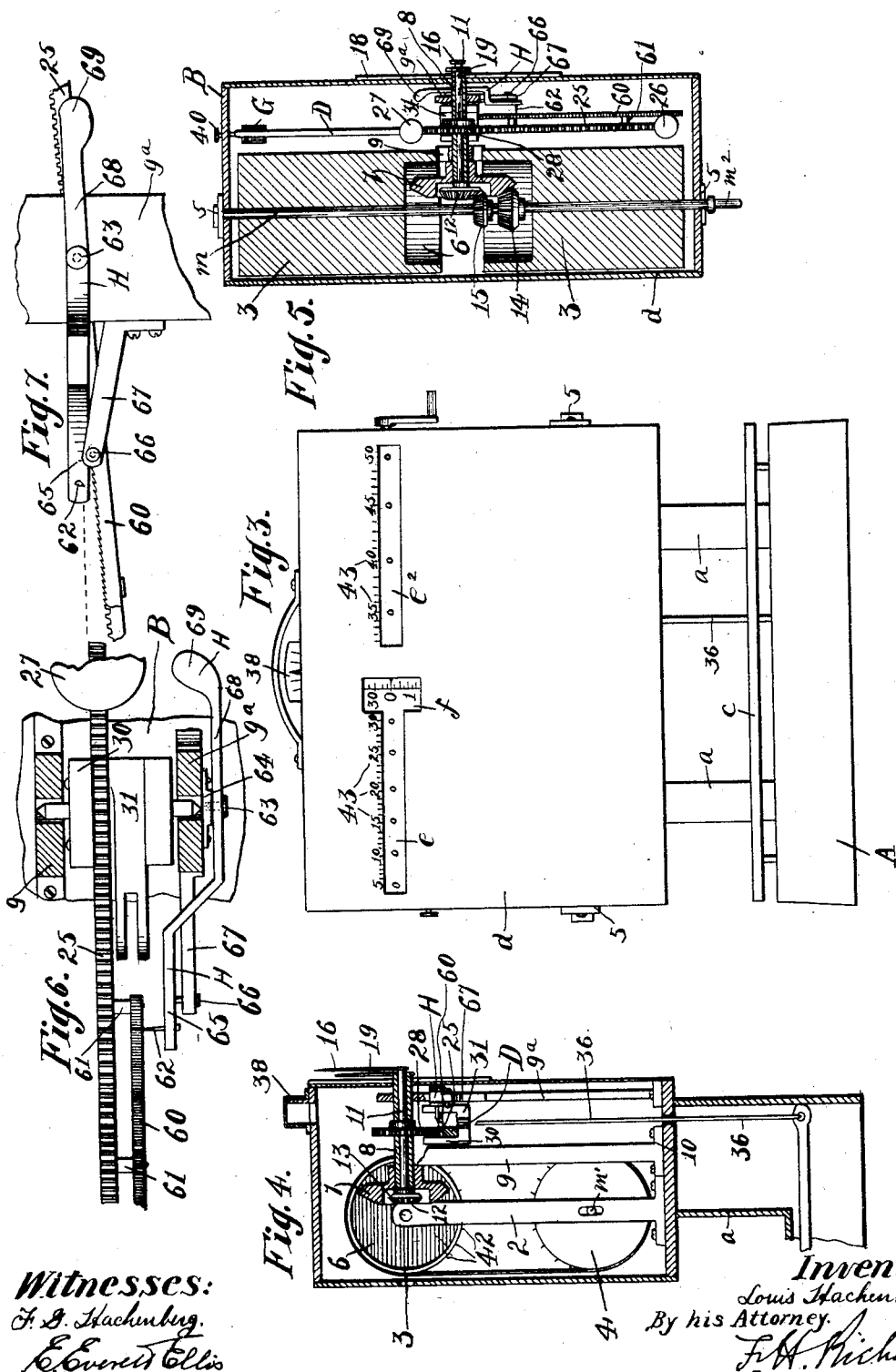
Witnesses:
F. D. Hachenberg.
E. Everett Ellis.
Inventor:
Louis Hachenberg.
By his Attorney,
F. H. Richard.

No. 744,067. Patented November 17, 1903.

UNITED STATES PATENT OFFICE.

LOUIS HACHENBERG, OF NEW YORK, N. Y.

WEIGHING-MACHINE.

SPECIFICATION forming part of Letters Patent No. 744,067, dated November 17, 1903.

Application filed October 28, 1902. Serial No. 129,093. (No model.)

*To all whom it may concern:*

Be it known that I, LOUIS HACHENBERG, a citizen of the United States, residing in New York, in the county of New York and State of New York, have invented certain new and useful Improvements in Weighing-Machines, of which the following is a specification.

This invention relates to scales or weighing-machines; and it consists, substantially, in the improvements hereinafter particularly described.

The invention has reference more especially to scales or weighing-machines of that type in which are embodied a movable beam and a balancing device thereon and in which the adjustments of the balancing device are effected through the instrumentality of independently-operated hand mechanism mounted in suitable position upon the machine.

Though applicable to other purposes, my improvements are intended more especially for use in establishments wherein articles or commodities are weighed and sold at retail; and one of the principal objects of my invention is to provide a weighing-machine of the type referred to with means for visually indicating to the operator or salesman both the weight and the selling price of an article weighed on the machine and with additional means for similarly indicating to the purchaser the weight of the article.

The invention also has for its object to provide means for arresting the movement of the balancing device on the beam at the point of counterbalance thereof with an article being weighed and also to provide a weighing-machine of this general character which is simple in its construction and organization and one that is reliable and thoroughly effective in use or operation.

The above and additional objects are attained by means substantially such as are illustrated in the accompanying drawings, in which—

Figure 1 is a vertical longitudinal elevational view of my improved weighing-machine, the same being taken from the front of the machine and partly broken away and illustrating some of the internal mechanism thereof, more especially the means for indicating to the operator or salesman the weight and selling price of an article. Fig. 2 is a similar view to Fig. 1, taken from the rear of the machine, the back of the casing being removed. Fig. 3 is a front elevation of the machine as it appears when ready for use or operation. Fig. 4 is a vertical transverse sectional view of the machine with parts broken off at the bottom, and Fig. 5 is a sectional plan view thereof to more clearly indicate the construction and organization of some of the elements or parts contributing to the general embodiment. Fig. 6 is an enlarged plan view in detail of the means employed for arresting the movement of the balancing device on the beam at the point of counterbalance with the latter of an article weighed on the machine, and Fig. 7 is a side view of said means. Fig. 8 is a perspective view in detail, showing the construction of the supporting-yoke for the scale-beam.

Before proceeding with a more detailed description it may be stated that I may employ any suitable scale mechanism in connection with my present improvements; but preferably I have herein illustrated a centrally-fulcrumed scale-beam having a balancing device thereon and also having suitable connection with a scale pan or platform. Hand-operated mechanism is also preferably employed for moving the balancing device upon the beam, the actuating force being applied at a point substantially coincident with the fulcrum-axis of the beam, and movably connected to said mechanism are devices for visually indicating to the operator or salesman both the weight and selling price of the article so weighed, together with other devices for indicating to the customer or purchaser the weight of the article. The several operative elements or parts of the machine are mainly inclosed in a casing therefor, and the said first-named indicating devices are of special construction and organization, the same comprising a carrier bearing appropriate characters or marks constituting indications which are brought to view before an opening or slot in the casing. Such carrier may be of various forms and constructions—for instance, an endless band may be used. The said second above-named indicating devices are also of special construction, and the two said devices coöperate with each other in simultaneously producing the effects or results desired.

I still further employ special means for arresting the movement of the balancing device on the beam at the point of counterbalance of the latter with an article weighed on the machine, and while I have herein shown said means in connection with my present embodiment of weighing-machine it will be understood that I am not limited thereto in practice, since the same are equally applicable to other weighing-machines involving a pivoted beam having a movable balancing device thereon. I may employ either a pan or a platform on which to place articles or commodities to be weighed, and it may be stated that my improved weighing-machine is both simple in construction and organization and comparatively cheap to manufacture.

Specific reference being had to the accompanying drawings by the designating characters marked thereon, A represents a suitable base having standards or uprights $a\ a$, upon which is mounted or supported a suitable casing or shell B, in which are mainly inclosed the several operative devices or mechanisms contributing to my present improvements, the said base in the present instance being practically an extension of a box or frame for inclosing an ordinary scale mechanism, (not shown,) of which the platform $c$ may be said to constitute a part, as shown. In the front $d$ of said casing or shell B preferably two longitudinal openings or slots $e$ and $e^2$ are formed at a convenient height, the longer edges or sides of one, $e$, of said slots intersecting with one of the edges or sides of a vertical slot $f$, also formed in the front of the casing intermediate the two said longitudinal openings or slots, it being remarked that the said casing is preferably rectangular in form, although the same may be otherwise constructed, if desired.

Mounted upon the bottom of the casing at or near the end sections thereof are suitable standards or uprights 2, between which are rotatably supported in proper bearings therefor the shafts $m\ m'$ of duplicate upper rollers 3 and duplicate lower rollers 4, respectively, said rollers being preferably of equal length and diameter with each other, and passing over each vertical pair of the same is an endless movable band C of suitable material, which is maintained sufficiently taut by means of preferably the bearings 5 for the shaft of the lower rollers, said bearings being shown as adjustable (see Fig. 4) for that purpose. The outer surface of the front $d$ of the casing is provided along the upper edges of the two openings or longitudinal slots $e$ and $e^2$ therein with a series of numerals, as "5," "10," and so on up to "50," more or less, said numerals being preferably located with respect to vertical columns of numerals $g$, provided on the outer surface of each of the bands C a proper distance apart, each of said numerals of each of said columns being representative of the selling price of an article or commodity of a certain weight and each of said numerals "5," "10," &c., being representative of the pounds value of the article, as will hereinafter be more fully explained. Also provided on the outer surface of one of said bands C, preferably at the inner edge thereof, is a vertical column of numerals $h$, arranged in line with the horizontal rows of said numerals $g$ and varying downwardly from "1" to any desired maximum denomination, said numerals $h$ each being representative of the weight of an article or commodity weighed on the machine. The inner end of each of the said upper rollers 3 is hollowed out or recessed at 6, (see Fig. 5,) by which to accommodate a beveled gear-wheel 7, fixed to one end of a rotatable hollow shaft or spindle 8, which is supported in suitable bearings therefor at the upper end of a standard 9, mounted at 10 on the bottom of the casing B, said hollow shaft or spindle extending transversely of the machine, with the other end thereof projecting through an opening in the back or rear of the casing. (See Figs. 4 and 5.) Fitting within the hollow shaft or spindle is an independently-rotatable shaft or spindle 11, the outer end of which projects slightly beyond the outer end of said former shaft or spindle and to the inner end of which is fixed a smaller beveled gear-wheel 12, which is located within a recess 13, formed in the adjacent face of the beveled gear-wheel 7, this latter wheel being the larger of the two, as shown. The teeth of said larger beveled gear-wheel 7 are engaged by the teeth of a beveled pinion 14, fastened to the shaft $m$ of the upper rollers 3, while the teeth of the smaller wheel 12 are similarly engaged by the teeth of another pinion 15, also fastened to said shaft, said pinions being thus adapted to be turned with said shaft in the manner and for the purpose hereinafter explained. Secured to the outer projecting end of the said independently-rotatable spindle 11 is a hand or pointer 16, which works over the divisions 17 of a dial or scale-disk 18 for indicating fractions of pounds weight of an article weighed on the machine, while similarly secured to the outer end of said hollow rotatable shaft or spindle 8 is another but shorter hand or pointer 19, which works over other divisions 20 of the said dial or scale-plate for indicating pounds weight of the article, it being apparent that said indications may be easily and quickly read or observed by the customer or purchaser from the rear or back of the machine, and it being noted that both said hands or pointers are moved at the same time, though for unequal distances, due to the difference in the dimensions of the said gear-wheels 7 and 12.

Supported in any suitable manner within the casing B is a movable scale-beam D, which is provided, preferably on the upper part thereof, with a longitudinally slidable or adjustable rack 25, having connected to its ends the poises 26 and 27, which constitute a balancing device for the beam, the said rack being permanently engaged by a pinion 28, carried by the said hollow shaft or spindle 8 of the enlarged beveled gear, hereinbefore referred to, so that when the shaft $m$ is operated through the medium of its handle $m^2$ to establish counterbalance of an article with the beam the said rack and balancing device will be moved or adjusted upon the beam, as is apparent. In order that the action of shifting the balancing device or otherwise effecting an equipoised condition of the system shall not of itself operate to tilt the beam, the force exerted by the pinion 28 on the rack is applied at a point substantially coincident with the fulcrum-axis of the beam, or at least the line of application of such force intersects such axis. Preferably I secure the scale-beam at substantially the central point 29 thereof to one of the duplicate branches 30 of a yoke 31, (see Fig. 8,) said branches each being formed or provided on the outer side thereof with a knife-edge 32 and said knife-edges being supported in bearings therefor at the upper ends of the standard or upright 9 and an additional standard or upright $9^a$, (see Fig. 4,) the said beam being thus rendered sensitive to any weight imposed upon the scale pan or platform $c$, which is in movable connection with the beam by means of a rod 36, as shown. Secured to one side of the scale-beam, also substantially at the central point thereof, is an upright hand or pointer 37, the end of which projects through an opening therefor in the upper part of the casing and moves over the divisions of a scale 38, said hand or pointer always indicating zero of said scale when the scale-beam is perfectly balanced. In order to compensate for inaccuracy of operation of the said scale-beam accidentally arising from any cause, I provide the said beam with an auxiliary counterbalance or adjusting device G, which is capable of adjustment relatively to the beam by means of a screw or other device 40, the use of such auxiliary counterbalance device being well understood.

In explanation of the operation of my improved weighing-machine it may be stated that on placing an article or commodity on the scale pan or platform to be weighed the scale-beam will be tilted on its knife-edge bearings an extent proportionate to the weight of said article, whereupon by taking hold of the handle $m^2$ of the shaft $m$ and turning the latter in the proper direction the rack on the scale-beam will be operated to move the balancing device until a counterbalance of the article with the beam has been established, it being understood that when the article is first placed on the scale pan or platform the hand or pointer 37 is moved past zero of the scale 38 and that when the counterbalance of the article, with the beam, is struck the said hand or pointer is again moved back to zero, these movements of the hand or pointer in question being effected by the movements of the beam, as is obvious. When the shaft $m$ is thus turned, the upper duplicate rollers 3 are turned therewith, and consequently the endless bands C are moved a corresponding distance, this motion being also communicated by said bands to the lower duplicate rollers 4, and it being here mentioned that the bands may, if desired, be provided with perforations at the edges to receive corresponding pins 42 on the said duplicate rollers 3 and 4, by which to prevent slipping of the bands and insure the perfect operation thereof. The spaces between the numerals on the outer face of the front of the casing at the slots $e$ $e^2$ therein may be provided with proper divisions 43 to indicate fractions of pounds value of an article to be weighed, and the movable bands C may likewise, if desired, be provided intermediate of the numerals of the several vertical columns $g$ thereon with similar divisions (not shown) representative of fractional amounts of the selling price of the article; but for the purposes of the present description it is deemed unnecessary to deal with fractional quantities and to only refer to whole numbers by way of explanation. Thus it will be seen that by placing an article on the pan or platform weighing three pounds and then operating the shaft $m$, as described, until a counterbalance of the article and beam is effected the bands C will be moved until the numeral "3" of the column $h$ at the edge of one of said bands is brought to position before the slot $f$, and thus the operator or salesman is enabled to see at a glance and without mental calculation just what the weight of the article is. Now if the selling price of such article is, say, fifteen cents (15¢) per pound, all the operator or salesman has to do is to simply glance at that one of the numerals of the vertical columns $g$ thereof which has been moved to position before the slot $e$ of the casing, and he at once determines that the total selling price of the article is forty-five cents, (45¢,) and so on according to the variations of weight and selling prices of different articles. At the same time the hands or pointers 16 and 19 will have been caused to move over their respective divisions on the scale plate or disk 18, to thus indicate to the customer or purchaser the weight of the article. On removal of the article from the scale or pan the shaft $m$ may be reversely operated to restore the several elements or parts to their original positions. I desire to state at this point that instead of employing the duplicate endless movable bands herein shown and described I may, if desired, employ but a single band only, in which case but a single vertical pair of the rollers 3 and 4 would be employed, as well as a single longitudinal slot or opening in the front of the casing. Preferably, however, I employ the present embodiment as being more convenient and economical for several reasons.

In weighing-machines in general in which are involved a pivoted scale-beam and a balancing device thereon substantially of the form herein shown considerable annoyance and loss of time are frequently encountered in weighing operations due to the fact that in moving or adjusting the balancing device on the beam to effect counterbalance with the latter of an article being weighed the said balancing device is frequently carried beyond the necessary point of equilibrium and requires to be moved back and forth until such point is reached. To overcome this, I provide special means whereby immediately an equilibrium is established between an article being weighed and the beam. The balancing device on the latter is arrested or brought to a stop, the action of such means being such that no shock occurs either to the beam or other parts of the machine, since the said beam is not prevented from vibrating in the ordinary way to finally come to a position of rest. This feature of my invention is considered to be broadly new, and the special means referred to preferably consist in the present instance of a longitudinal ratchet 60, which is connected at the points 61 61 to the movable or adjustable rack 25 on the scale-beam D, the teeth of said ratchet being engaged by a sharp-edged projection 62, carried at one side of a movable bent lever H, which is fulcrumed upon a pin 63, fitting in an opening therefor in a plate 64, secured in any suitable way to the outer side of the standard or upright 9ª, (see Figs. 6 and 7,) the arm 65 of the lever normally resting in a truly horizontal position upon a pin or projection 66 from a bracket 67, secured to an edge of said standard or upright, while the arm 68 of said lever is preferably weighted at 69, by which to prevent by counterbalance any weight of the lever from being imposed upon the ratchet, and thus not interfere with the accuracy of operation of the scale-beam. As thus constructed and organized, it will be seen that as soon as equilibrium of the scale-beam is established some one of the teeth of the said ratchet 60 will be engaged by the projection 62 on the said lever H, and the balancing device on the beam will be thus stopped or arrested in its movement. In the vertical movements of said beam the said ratchet moves therewith; but the said projection 62 will always be in position to properly engage the latter in the manner and for the purpose stated, and it will be seen that the desired results are obtained in an effective manner. If desired, the said lever may be supported by a knife-edge bearing, and it is apparent that deviations may be made from the general embodiment herein shown and described without departing from the spirit and scope of my invention.

Having thus described my invention, what I claim is—

1. The combination of a member comprising a casing provided with an opening adjacent to which are markings constituting an index, a member comprising a carrier provided with markings and which markings are visible through the opening in the casing, one of said members being hand-operable to effect its shifting relatively to the other; a weighing system including a poise and a scale-beam; means for shifting the center of gravity of the system including the scale-beam; a hand-operable actuating part mounted independently of the beam, and acting on said means at a point substantially coincident with the fulcrum-axis of the beam; and means compelling the relative shifting movement of the said movable members to occur in unison with the operation of said hand-operable actuating part.

2. The combination with a scale-beam, of means for varying its center of gravity, a hand-operable actuating part mounted independently of the beam and acting on said means at a point substantially coincident with the fulcrum-axis of the beam, a carrier member having marked thereon the selling prices of various weights of commodity at divers prices per unit weight, an index member embodying markings corresponding to the prices per unit weight, both said members being mounted independently of the beam and one of the members being hand-operable to effect its movement relatively to the other, means compelling the movement of the movable member aforesaid to occur in unison with the operation of said hand-operable actuating part, and a device for arresting the movement of the said means for varying the center of gravity of the scale-beam simultaneously with the establishment of equilibrium.

3. The combination with a hand-operable carrier having marked thereon the selling prices of various weights of commodity at divers prices per unit weight, of a fixed index embodying markings corresponding to the price per unit weight, a hand-operable weighing mechanism, mechanism compelling the operation of the carrier to occur in unison with the operation of the weighing mechanism, and a device for arresting the movement of the weighing mechanism simultaneously with the establishment of equilibrium.

4. The combination with a hand-operable carrier having marked thereon the selling prices of various weights of commodity at divers prices per unit weight, of a fixed index embodying markings corresponding to the prices per unit weight, a traveling poise geared to the carrier, a device for arresting the movement of the weighing mechanism simultaneously with the establishment of equilibrium, and a pointer and scale for indicating the weight of the article weighed.

5. The combination with a hand-operable carrier having marked thereon the selling prices of various weights of commodity at divers prices per unit weight, of a fixed index embodying markings corresponding to the prices per unit weight, a scale-beam, a traveling poise geared to the carrier, a device for arresting the movement of the poise simultaneously with the establishment of equilibrium, a pointer for indicating the position of the scale-beam relatively to the horizontal, and a pointer and scale for indicating the weight of the article weighed.

6. The combination of a casing provided with an opening, a hand-operable carrier having marked thereon the selling prices of various weights of commodity at divers prices per unit weight and which markings are visible through the opening in the casing, a fixed index embodying markings along the edge of the opening in the casing corresponding to the prices per unit weight, a scale-beam, a traveling poise geared to the carrier, a device for arresting the movement of the poise simultaneously with the establishment of equilibrium, a pointer for indicating the position of the scale-beam relatively to the horizontal, and a pointer and scale on the side of the casing opposite to that in which the opening therein is located for indicating the weight of the article weighed.

7. The combination with a casing having an opening therein, a pair of driving-rolls mounted therein, a corresponding pair of guide-rolls, a pair of belts engaging with said rolls and having marked thereon the selling prices of various weights of commodity at divers prices per unit weight, said markings being visible through the opening in the casing, a fixed index embodying markings along the edge of the opening in the casing corresponding to the prices per unit weight, a crank for rotating the driving-rolls, a scale-beam, a traveling poise provided with a rack, a pinion engaging with the rack and geared to the driving-rolls, a device for arresting the movement of the traveling poise simultaneously with the establishment of equilibrium, and a scale and pointer for indicating the weight of the article weighed.

8. A weighing-machine comprising a casing formed in the front thereof with duplicate longitudinal slots and an intermediate vertical slot, duplicate upper and lower rollers within the casing, the inner ends of the upper rollers being recessed, duplicate movable bands passing over the vertical pairs of said rollers and having thereon vertical columns of numerals representative, respectively, of the selling price of an article weighed on the machine, pinions on the shaft of the upper rollers, an enlarged bevel gear-wheel mounted in the casing and engaging one of said pinions, said gear-wheel being recessed in its face and having a hollow shaft or spindle, a smaller beveled gear-wheel seated within the recess of the larger wheel and having a shaft or spindle extending through said hollow shaft or spindle, an indicator-disk at the rear of the machine, and indicating-hands mounted on the projecting ends of the two said shafts or spindles and moving over said indicator-disk, a pinion carried by the hollow shaft or spindle, a pivoted scale-beam having a rack engaged by said pinion and provided at each end with a poise, and means for turning the shaft of the upper rollers.

9. The combination of a casing provided with an opening, a hand-operable carrier having marked thereon the selling prices of various weights of commodity at divers prices per unit weight and which markings are visible through the opening in the casing; a fixed index embodying markings along the edge of the opening in the casing corresponding to the prices per unit weight, a scale-beam, and a traveling poise geared to said carrier and the force for actuating which is transmitted thereto at a point substantially coincident with the fulcrum-axis of the scale-beam.

10. The combination of a casing provided with an opening, a hand-operable carrier having marked thereon the selling prices of various weights of commodity at divers prices per unit weight and which markings are visible through the opening in the casing, a fixed index embodying markings along the edge of the opening in the casing corresponding to the prices per unit weight, a scale-beam, a traveling poise geared to said carrier and the force for actuating which is transmitted thereto at a point substantially coincident with the fulcrum-axis of the scale-beam, and a pointer and scale for indicating the weight of the article weighed.

11. The combination of a casing provided with an opening, a hand-operable carrier having marked thereon the selling prices of various weights of commodity at divers prices per unit weight and which markings are visible through the opening in the casing, a fixed index embodying markings along the edge of the opening in the casing corresponding to the prices per unit weight, a scale-beam, a traveling poise geared to said carrier and the force for actuating which is transmitted thereto at a point substantially coincident with the fulcrum-axis of the scale-beam, a pointer for indicating the position of the scale-beam relatively to the horizontal, and a pointer and scale on the side of the casing opposite to that in which the opening therein is located for indicating the weight of the article weighed.

Signed at Nos. 9 to 15 Murray street, New York, N. Y., this 24th day of October, 1902.

LOUIS HACHENBERG.

Witnesses:
JOHN O. SEIFERT,
E. EVERETT ELLIS.